United States Patent [19]
Symons et al.

[11] Patent Number: 5,202,299
[45] Date of Patent: Apr. 13, 1993

[54] CATALYTIC WASHCOAT FOR TREATMENT OF DIESEL EXHAUST

[75] Inventors: Walter T. Symons, Davison; Richard F. Beckmeyer, Clarkston, both of Mich.

[73] Assignee: General Motors Corporation, Detroit, Mich.

[21] Appl. No.: 812,327

[22] Filed: Dec. 23, 1991

[51] Int. Cl.$^5$ .................. B01J 21/06; B01J 23/26; B01J 23/40; B01J 23/72

[52] U.S. Cl. .................. 502/242; 502/244; 502/256; 502/261

[58] Field of Search ............... 502/244, 256, 261, 242

[56] References Cited

U.S. PATENT DOCUMENTS

| | | | |
|---|---|---|---|
| 2,882,245 | 4/1959 | Heinmann et al. | 502/261 |
| 3,491,020 | 1/1970 | Carr et al. | 502/261 |
| 3,518,206 | 6/1970 | Sowards et al. | 502/244 |
| 3,956,185 | 5/1976 | Yagi et al. | 502/261 |
| 4,749,671 | 6/1988 | Saito et al. | 502/64 |
| 4,760,044 | 7/1988 | Joy, III et al. | 502/303 |
| 4,868,148 | 9/1989 | Henk et al. | 502/303 |

FOREIGN PATENT DOCUMENTS 3158129 7/1988 Japan .................. 502/261

*Primary Examiner*—Carl F. Dees
*Attorney, Agent, or Firm*—George A. Grove

[57] ABSTRACT

A catalyst for treatment of exhaust emissions from diesel engines includes a washcoat layer with a catalytically active metal. The washcoat layer has refractory oxide particles with catalytically active metal particles dispersed thereon, and colloidal silica disposed in a thin layer over the refractory oxide and metal particles. The refractory oxide particles and colloidal silica are each characterized by respective surface charges at a selected pH to cause the colloid to form the layer over the refractory oxide and metal particles. Preferably, the pH is selected to provide opposite and attractive surface charges between the colloidal silica and the refractory oxide particles. Preferably, the metal particles are at least one of the group consisting essentially of platinum, palladium, rhodium, ruthenium, copper and chromium.

14 Claims, 1 Drawing Sheet

CATALYTIC WASHCOAT FOR TREATMENT OF DIESEL EXHAUST

FIELD OF THE INVENTION

This invention relates to a catalyst support for a catalytic converter. More particularly, it relates to refractory oxide coatings with catalytic metal disposed below a thin layer of colloidal silica and having significantly less reaction with sulfur compounds when applied to diesel engine exhaust gas catalyst supports.

BACKGROUND OF THE INVENTION

Exhaust emissions from an engine, such as in a vehicle, are treated in a catalytic converter which includes catalytic material dispersed on a support. In order to treat vehicle exhaust gas emissions, the support typically includes a metal or ceramic base, which is coated with a refractory oxide or ceramic material, such as alumina. The catalytic material carried by the support promotes oxidation of unburned or partially oxidized hydrocarbons and carbon monoxide and promotes the reduction of nitrogen oxides. In the case of diesel engines, it is necessary to treat diesel particulates which are typically on the order of 0.1 micron in diameter and contain a solid, carbonaceous portion and a soluble organic portion.

Diesel particulate can be collected and removed from an exhaust gas stream by various types of filters or traps. In order to remove collected particulate, the traps are heated to an elevated temperature, which is greater than the exhaust temperature, by heaters. This approach to treating particulate is technically difficult and costly, and introduces a variety of other undesirable problems.

It is desirable to treat diesel particulate by continuous catalytic combustion of particulate in the exhaust gas stream over a catalyst in a catalytic converter in a method similar to the treatment of gaseous hydrocarbon emissions. Converters using substrates coated with alumina, such as alumina-coated monoliths, have been evaluated for this purpose. However, such alumina-coated supports promote an undesirable reaction with sulfur which is present in a relatively large amount in diesel fuels as compared to gasoline.

Silicas have been used as catalyst supports but have not been favored for use with vehicles due to the high temperature of operation of the vehicle, the relatively low thermal stability of silica as compared to alumina, and the relatively low adherence of silica to a base substrate.

In order to improve adherence of silica, U.S. Pat. No. 5,114,901 issued May 19, 1992, assigned to the assignee of the present application, describes a support consisting of two groups of silica particles of non-overlapping sizes where one group occupies voids between the other group when applied as a washcoat layer (catalyst support). Catalytic metal is dispersed on the outer surface of the applied washcoat layer (post-impregnation). Although the washcoat layer of U.S. Pat. No. 5,114,901 provides improved adherence and reduced reaction with sulfur, further improvement is desirable.

BRIEF SUMMARY OF THE INVENTION

In accordance with the invention, a catalyst support is prepared with refractory oxide particles having dispersed (impregnated) thereon at least one catalytically active metal and a thin layer of colloidal silica which overlies the impregnated refractory oxide particles.

The colloidal silica has a relatively low affinity for sulfur oxides such as sulfur dioxide ($SO_2$). Thus, colloidal silica prevents undesired reaction of sulfur oxides, while at the same time permitting other constituents of diesel exhaust emissions to react with the catalytically active metal disposed below the thin layer formed by the colloidal silica.

The refractory oxide particles are relatively large compared to the much smaller, very fine particles of the colloidal silica. The larger refractory oxide particles are referred to as a powder to distinguish from the smaller particles of the colloid.

In order to cause adherence of the colloidal silica to the refractory oxide, the refractory oxide is characterized by a surface charge which is in the range of neutral to positive in an aqueous solution at a pH in a range of about 2 to about 6. The colloidal silica is characterized by a negative surface charge at a pH of at least about 2. Preferably, the refractory oxide and colloidal silica are each selected to provide the aforementioned surface charges at a pH between about 2 and about 5. As used herein, the term neutral designates no surface charge, that is, an absence of net positive and net negative surface charge.

Desirably, the refractory oxide is at least one of silica, alumina, titania and zirconia. Preferably, silica powder is used which exhibits essentially a neutral surface charge over the entire pH range, and the silica powder is precalcined prior to impregnation to reduce its BET surface area.

In one embodiment, the refractory oxide particles are first impregnated with the catalytically active metal, calcined, and then the impregnated refractory oxide particles and the colloidal silica are mixed together at a pH selected to produce a lack of electrical repulsion between the particles and the colloid, such that each particle is encapsulated by the colloidal silica. The mixture is then applied, as a washcoat layer, to a catalyst support. Preferably, the pH is selected to produce an electrical attraction between the particles and the colloid.

In another embodiment, the impregnated refractory oxide particles are applied to a catalyst support and then the colloidal silica is applied as an overlayer onto the applied refractory oxide particles at the pH selected to produce the mutual attraction, or at least lack of electrical repulsion, between the refractory oxide particles and the colloid.

In a preferred method, the refractory oxide particles are impregnated with the catalytically active metal by spraying a solution of dissolved metal salts onto the refractory oxide particles and fixing the metal thereon by calcining. Next, a wet mixture of impregnated refractory oxide particles and colloidal silica is formed. Then, the mixture is applied, and the applied mixture is heated to sinter at least a portion of the colloidal silica.

Desirably, the step of heating to sinter the colloid is conducted for at least about one hour at about 450° C., and preferably at about 600° to 650° C. for about two hours.

Desirably, the catalytically active metal (catalytic metal) is one or a mixture of platinum (Pt), palladium (Pd), rhodium (Rh), ruthenium (Ru), copper (Cu) and chromium (Cr), and preferably platinum or palladium, although trace amounts of other metals may be present due to limitations of metal refining.

Advantageously, the wet mixture of colloidal silica and impregnated refractory oxide particles need not be immediately applied to the support. Preferably, the wet mixture is maintained at about room temperature for several hours to promote contact of the refractory oxide particles and the colloidal particles, thus reducing agglomeration and improving slurry stability.

Therefore, it is an object of the invention to provide a catalyst support with a washcoat layer which is suitable for treatment of diesel exhaust, which catalyzes oxidation of hydrocarbon and which minimizes reaction of sulfur oxides. It is also an object to provide a method of making the catalyst support.

DETAILED DESCRIPTION OF THE PREFERRED EMBODIMENTS

Figure 1:
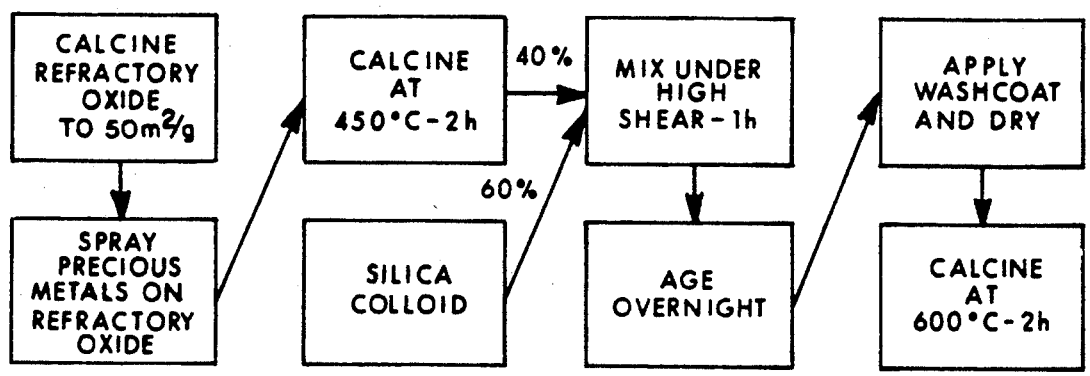
FIG. 1 is a flow diagram showing a preferred process of preparing the catalyst support of the invention.

In accordance with the invention, a catalyst support is prepared with refractory oxide particles having dispersed (impregnated) thereon particles of at least one catalytically active metal, and a thin layer of colloidal silica disposed over the refractory oxide and metal particles.

In one embodiment, the refractory oxide particles are first impregnated with the catalytically active metal, and then the impregnated refractory oxide particles and the colloidal silica are mixed together at a pH selected to produce a lack of electrical repulsion between the particles and the colloid, such that each particle is encapsulated by the colloidal silica. The mixture is then applied, as a washcoat layer, to a catalyst support. Preferably, the pH is selected to produce an electrical attraction between the particles and the colloid.

In an alternative embodiment, the impregnated refractory oxide particles are applied to a catalyst support, and then the colloidal silica is applied as an overlayer onto the applied particles at the pH selected to produce the mutual attraction or at least lack of electrical repulsion between the refractory oxide particles and the colloid.

The refractory oxide particles are relatively large compared to the much smaller, very fine particles of the colloidal silica. The larger refractory oxide particles are referred to as a powder to distinguish from the smaller particles of the colloid.

In order to cause adherence of the colloidal silica to the refractory oxide, the refractory oxide is characterized by a surface charge which is in the range of neutral to positive in an aqueous solution at a pH in a range of about 2 to about 6. The colloidal silica is characterized by a negative surface charge at a pH of at least about 2. Preferably, the refractory oxide is selected to produce a positive surface charge and the colloidal silica is selected to produce a negative surface charge at a pH between about 2 and about 5. As used herein, the term neutral designates no surface charge, that is, an absence of net positive and net negative charge.

As described above, the refractory oxide must exhibit a neutral to positive surface charge over at least some portion of the pH range. Desirably, the refractory oxide is at least one of silica, alumina, titania and zirconia. Preferably, the refractory oxide is silica powder, which exhibits essentially a neutral surface charge over the entire pH range, and the silica powder is precalcined prior to impregnation to reduce its BET surface area.

Refractory oxides such as alumina, titania and zirconia all exhibit positive surface charges at a pH below 5 where colloidal silica has a negative surface charge. Thus, the preferred electrical attraction exists between such refractory oxides and the colloid silica at the preferred pH between about 2 and about 5.

In a preferred method, the refractory oxide particles are impregnated with the catalytically active metal by spraying a solution of dissolved metal salts onto the refractory oxide particles and fixing the metal thereon by calcining. Next, a wet mixture of refractory oxide particles and colloidal silica is formed. The mixture is permitted to age, preferably overnight. Then, the mixture is applied, and the applied mixture is heated to sinter at least a portion of the colloidal silica.

It has been found that good results are achieved by using silica powder (refractory oxide particles) and colloidal silica. The silica powder is first calcined to reduce its BET surface area. Next, catalytically active dissolved metal salts are dispersed or deposited onto the powder silica and then calcined to fix the catalytic metal particles on the particles of the silica powder.

The impregnated refractory oxide particles are added to the colloidal silica in a wet mixture or slurry, at the preferred pH, such that the colloidal silica encapsulates the refractory oxide particles. Next, the wet mixture is permitted to age and then is applied to a monolithic support.

Desirably, the catalytically active metal (catalytic metal) is one or a mixture of platinum (Pt), palladium (Pd), rhodium (Rh), ruthenium (Ru), copper (Cu) and chromium (Cr), and preferably, platinum or palladium, although trace amounts of other metals may be present due to limitations of metal refining.

EXAMPLE 1

In this example, a catalyst with a monolithictype support carrying a catalytically active washcoat layer (designated as DS-4C Pt/Rh) was prepared using silica as the refractory oxide particles and colloidal silica. The basic steps used in this example are diagrammatically shown in FIG. 1.

The colloidal silica had a BET surface area in the range of 25 to 30 square meters per gram ($m^2/g$), as received from the vendor, Elkem, under the designation EMS 970S.

The fine particles of the colloidal silica had an average size, that is, an equivalent spherical diameter, of about 0.02 microns. An equivalent spherical diameter is the diameter of a sphere having a volume equal to the volume occupied by an irregularly shaped object.) Other properties of colloidal silica include a chemical composition of about 94 to 98 percent amorphous silicon dioxide and about 2 percent or less of impurities such as carbon, alkali and alkaline earth metals, iron and alumina. Titrations in the range of pH of about 2 to about 10 were conducted while monitoring the surface charge (Zeta potential) of the EMS 970S colloid. The colloid exhibited a Zeta potential of about −8 mV to about −18 mV as pH was increased from about 1 to about 10.

The silica powder had a BET surface area in the range of 400 to 700 $m^2/g$, as received from the vendor, Rhone-Poulenc. The particles are referred to as Rhone-Poulenc-540 GM. The particles had an average size, that is, an equivalent spherical diameter, of about 14 microns. This silica powder exhibited no surface charge over the entire pH range and was readily covered or encapsulated with the colloidal silica due to the lack of repulsive forces, as described below. Other properties of the silica powder include a chemical composition similar to that of the colloid, namely, amorphous silicon dioxide with small amounts of impurities. Titrations in the range of pH of about 2 to about 10 were conducted while monitoring the surface charge (Zeta potential) of the 540 GM powder. The powder exhibited a Zeta potential of zero mV at a pH of between about 2 and 6, and tended to exhibit a slight negative mV reading as the pH increased to about 10. This slightly negative mVolt reading for the powder is still considered relatively neutral given the limits of Zeta potential (surface charge) analysis, experimental error and comparison relative to the results of the Zeta potential analysis of colloidal silica.

The silica powder was first precalcined at about 900° C. for about four hours to reduce its surface area to less than about 100 $m^2/g$ and an average of 50 $m^2/g$.

Platinum and rhodium, tetra-amine precursors, (Pt/Rh) dissolved in water, was then sprayed onto the powder to impregnate the refractory oxide particles with metal particles. Next, the impregnated powder was calcined at about 450° C. for about two hours to fix the precious metals on the surface of the individual particles of powder.

Next, a washcoat mixture was formed by adding the impregnated refractory oxide powder to colloidal silica at a pH of about 3 to about 5.5.

The washcoat mixture included the refractory oxide and colloid in the following relative amounts: about 40 percent by weight of the calcined powder silica and about 60 percent by weight colloidal silica. The powder and colloid were intermingled in an aqueous slurry by mixing in water. Mixing occurred at a high shear rate for about one hour. About 45 grams of water were used for every 55 grams of the intermingled colloid and powder. The pH of the slurry was adjusted to about 5 while mixing.

The slurry (wet mixture) was permitted to age overnight or for more than about two hours at room temperature (about 10° C. to 40° C.). The slurry can be applied immediately, but it would need to be screened before application to remove agglomerates which could block channels of a monolith during subsequent coating.

The washcoat was then applied to an 85 $in^3$ capacity, 225 cells/$in^2$ (CPSI) herringbone metal monolith. The monolith used was oxidized, corrugated metal layers which were held together by rings on each end. The coated monolith was dried in a heated airstream at about 50° C. to about 80° C., while being rotated about its axis to enhance coating uniformity.

After drying, the coated monolith was calcined at about 600° C. for about two hours to sinter at least a portion of the colloidal silica layer. The temperature of this step is important. The temperature must be high enough to promote sintering of at least some of the colloidal silica to reduce permeability of the layer, yet low enough so as not to deactivate the catalyst.

Monoliths were then assembled into a typical clamshell configuration for testing in vehicles and in dynamometer controlled engines.

COMPARATIVE EXAMPLE A

In this comparative example, a catalyst (DS-4A Pt/Rh) was prepared by a post-impregnated process using two groups of silica particles; one group was the 540 GM and the other was the EMS Elkem 970S. However, in this comparative example, the two groups were applied to form a different washcoat by a different method referred to as post-impregnation. In the method, the two groups were intermingled in a wet slurry, wherein the larger particles constituted approximately 40 percent by weight of the particles in the slurry and the smaller particles constituted the balance or about 60 percent. The wet slurry was then applied as a washcoat layer onto metal monoliths and then dried and calcined at 600° C. for one hour in a furnace. Next, precious metal catalytic material was dispersed onto the coated monoliths by a post-impregnation method. Such post-impregnation methods are generally known in the art. In this example, monoliths with calcined coatings were immersed in an aqueous solution of chloroplatinic acid and rhodium nitrate, and the loaded (post-impregnated) monoliths were dried and then calcined at about 420° C. for one hour.

EXAMPLE 2

Figure 2:
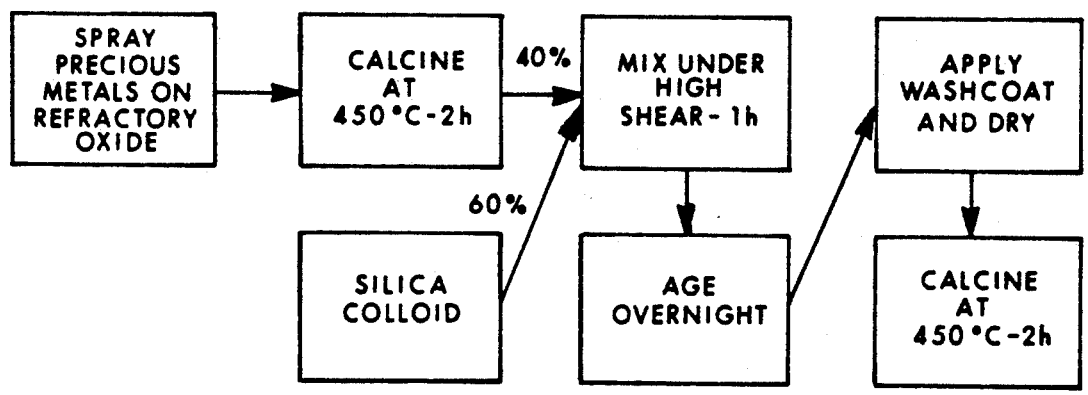
FIG. 2 is a flow diagram showing an alternative process of preparing the catalyst support of the invention.

Catalysts of the invention (DS-3D Pd, DS-4D Pd) were made by a process similar to Example 1, except that the initial calcination step was not included, the catalytically active metal was palladium (Pd) rather than Pt/Rh and the final step of heating to sinter was conducted at a reduced temperature of about 450° C. In this example, two catalysts were formed with Pd, one from a Pd tetraamine precursor (DS-3D) and the other from a Pd chloride precursor (DS-4D). Each catalyst was formed by the method described below and as diagrammatically shown in FIG. 2.

The Pd precursor was sprayed onto the silica powder, and the impregnated powder was then calcined at about 450° C. for about two hours. The powder was then mixed with colloidal silica in an aqueous solution at a high shear rate for about one hour. The proportion of powder, colloid, water and the pH were as described in Example 1. The mixture was aged overnight, then applied as a washcoat layer to a monolith and dried. A final step of calcining was conducted by heating at about 450° C. for about two hours to sinter at least some of the colloidal silica.

EXAMPLE 3

The method of Example 2 was followed except that the refractory oxide was alumina obtained from Condea under the designation SCFa-100, rather than the 540 GM silica, the pH of the slurry was adjusted to about 6, and the catalytically active metal was platinum loaded with a platinum amine precursor rather than palladium. This catalyst was designated DS-4DA Pt. Titrations in the pH range of about 2 to about 10 were conducted while monitoring the surface charge (Zeta potential in mVolts). This alumina powder exhibited a Zeta potential which was slightly positive at the lower pH and became slightly negative in the pH range of about 7 to about 10. (Actual values were within +1 to −1 mVolts.) This powder is considered relatively positive to neutral given the limits of Zeta potential (surface charge) analysis and experimental error.

TESTING AND COMPARISON WITH OTHER COATINGS

Before testing, each of the prepared monolithic catalysts was preconditioned on a 6.2L, V-8 diesel engine dynamometer for 24 hours according to a preset simulated driving schedule, which is an AMA Schedule. The catalyst converter test facility consisted of the dynamometer-controlled engine, a gas flow control system, emissions analysis and a computer interface. In the simulation, catalysts achieved an equilibrium level of soot accumulation while exposed to exhaust while engine operation was varied according to the schedule, under controlled conditions.

After such preconditioning, the catalysts were tested using a 6.2L, V-8 diesel engine dynamometer. In the test, the engine was run at 2,000 rpm at all times, and the inlet temperature of the exhaust to each converter was controlled during testing by fine-tuning the throttle opening and the back pressure valve downstream of the converter. Efficiency of particulate conversion was measured at four temperatures, starting from 400° C., 350° C., then 300° C., and finally 200° C. Sulfate efficiencies were determined at 350° C. and 400° C. Samples were drawn from the inlet and the outlet of the converter. The particulate was collected on filters. The weights of the filters prior to and after the particulate collection were measured to calculate the weight of the particulate collected. The efficiency of particulate conversion was calculated to be the difference in particulate weight collected at the inlet and outlet of the converter divided by the inlet.

Table 1 shows the particulate efficiency, at different temperatures, of the catalysts prepared by the method of Example 1 (DS-4C Pt/Rh) as compared to postimpregnated catalysts, as per Comparative Example A (DS-4A Pt/Rh). Negative particulate efficiencies of the DS-4A of Comparative Example A result from sulfuric acid formation. The sulfuric acid is deposited on the outlet filters in amounts so great as to cause the outlet particulate weight to exceed that of the inlet. In contrast, the positive particulate efficiencies of the DS-4C catalyst of Example 1 result from oxidation of hydrocarbon which reduces the weight of hydrocarbon articulate between inlet and outlet. At the same time, the catalyst of Example 1 minimizes reaction of sulfur oxides, so sulfur compounds are not accumulated on the outlet filter. As shown in Table 1, the sulfate efficiency of Example 1 is zero, the best achievable result, indicating no effect on sulfates. (The efficiency of sulfate conversion was calculated to be the difference in sulfate weight between the inlet and outlet of the correction divided by the inlet.) Sulfates are quantified by testing the filters analytically for sulfate content (colorimetric evaluation using barium perchlorate solution).

TABLE 1

| | Particulate Efficiencies | | Sulfate Efficiencies | |
|---|---|---|---|---|
| | Comparative Example A DS-4A Pt/Rh | Example 1 DS-4C Pt/Rh | Comparative Example A DS-4A Pt/Rh | Example 1 DS-4C Pt/Rh |
| 400° C. | −65.2% | 49.6% | −1200% | 0% |
| 350° C. | −26.5% | — | −618% | — |
| 300° C. | 7.4% | 56.3% | — | — |
| 200° C. | — | 60.3% | — | — |

As a further comparison, a catalyst was prepared by the method of Comparative Example A, except that the catalytically active metal was palladium (Pd) rather than Pt/Rh. This catalyst exhibited very good performance, thus indicating that the catalyst washcoat of the invention, when formed by the method of Example 1 and including Pd rather than Pt/Rh, would be expected to provide optimum results. This is further evidenced by the fact that the compositions DS-3D, DS-4D and DS-4DA, described above, performed as well as or better than their post-impregnation counterpart (i.e., formed by the method of Comparative Example A). The composition and method of the invention are expected to consistently produce superior catalytic washcoat layers if the final calcining temperature is high enough to promote sintering of the colloidal silica layer sufficient to achieve the desired reduction in permeability, as in Example 1.

Again, best results are expected when the method of Example 1 is conducted utilizing a palladium precursor while closely monitoring the final sintering step.

While not wishing to be limited to any particular theory, it is thought that the method and catalyst of the invention maximize hydrocarbon oxidation while minimizing reaction of sulfur oxides by the following mechanism. In the diesel exhaust, the heavy hydrocarbons are in a liquid state either in mist form or absorbed on carbon particulate. In either case, they are in liquid form or at least "sticky" so that they will deposit onto an oxide coating when the exhaust flow is forced through channels of a monolith, thus allowing the particulate and liquid mist to contact the cell walls of the monolith. On the other hand, the sulfur oxides present in the exhaust are in gaseous form. This provides an opportunity to "hide" the catalyst metal just slightly subsurface so that the liquid has time to absorb into the washcoat and come in contact with the catalyst metal, while the gaseous sulfur oxides do not penetrate the relatively impervious colloidal silica layer. Colloidal silica was selected because it was determined that it has no affinity for adsorption of sulfur oxides, and thus minimizes the time during which the sulfur oxides could contact the catalytic metal. This "hiding" of the catalytic metal is uniquely achieved by the method and catalyst product of the invention.

It is thought that a refractory oxide which exhibits no surface charge at a given pH is covered with a colloidal material which exhibits a negative surface charge because Van der Waal's forces cause attraction where there is no electrostatic repulsion. Therefore, even in the absence of mutual attraction caused by opposite charge, adequate adherence of the colloid to the powder is achieved by the invention at an appropriate pH selected to provide an absence of electrostatic repulsion.

The attainment of suitable surface charges upon application of the washcoat is achieved by more than one method. In one case, the appropriate surface charges are achieved when the colloidal silica is added to an aqueous solution at the selected pH, and then the impregnated refractory oxide particles (powder) are added to the solution and intermingled with the colloid. Then the intermingled materials are applied to a monolith.

Alternatively, separate solutions at the appropriate pH may be made, one solution containing the colloidal silica and the other solution containing the impregnated powder. The solution may be mixed and then applied to the monolith. In still another alternative, the impregnated powder may first be added to an aqueous solution at the appropriate pH and then applied to the monolith. Then the colloidal silica may be applied over the powder. In this alternative, the colloidal silica may be applied wet or dry. If the colloidal silica is dry, then the powder must still be wet so that the proper surface charge is produced. Thus, as long as proper pH control exists, the colloid and powder may be added together or sequentially with the powder being added first to the monolith.

While the invention has been described in terms of a few specific examples, it will be appreciated that others could readily be adopted by one skilled in the art. Accordingly, the scope of the invention is to be considered limited only by the following claims.

The embodiments of the invention in which an exclusive property or privilege is claimed are defined as follows:

1. A catalyst for treatment of exhaust emissions from diesel engines comprising a support member carrying a catalytically active washcoat layer,
    the washcoat layer consisting essentially of refractory oxide particles having dispersed thereon smaller particles of at least one catalytically active metal, and colloidal silica disposed in a thin layer overlying the refractory oxide particles and their dispersed metal coating, and
    the refractory oxide particles being at least one selected from the group consisting of silica, alumina, titania and zirconia.

2. A catalyst according to claim 1 wherein the colloidal silica encapsulates each of the refractory oxide particles.

3. A catalyst according to claim 1 wherein the refractory oxide particles are silica particles.

4. A catalyst according to claim 1 wherein the support member is a monolithic-type support with emissions contacting surfaces, and the refractory oxide particles are silica particles disposed in a layer overlying the emissions contacting surfaces.

5. A catalyst according to claim 4 wherein the catalytically active metal is at least one selected from the group consisting essentially of platinum, palladium, rhodium, ruthenium, copper and chromium.

6. A method of making a catalyst with a support member carrying a washcoat layer with a catalytically active metal for treatment of exhaust emissions from diesel engines comprising:
    a) selecting refractory oxide particles and colloidal silica, the refractory oxide particles characterized by a surface charge which is in a range of neutral to positive when the particles are dispersed in water at a pH value in the range of 2 to 10, and the colloidal silica characterized by the surface charge which is negative when dispersed in water at such pH value; and
    b) depositing catalytically active metal particles on the selected refractory oxide particles and fixing the metal particles thereon; and then
    c) applying the refractory oxide particles and the colloidal silica onto the support member while wetting at least one of them at said pH to produce an absence of repulsive charge between the refractory oxide particles and the colloidal silica, such that a catalytically active washcoat layer is formed having the colloidal silica dispersed as a thin layer overlying the refractory oxide and metal particles; and then
    d) heating for a time and at a temperature sufficient to sinter at least a portion of the colloidal silica without deactivating the catalytically active metal.

7. A method according to claim 6 wherein the pH value is between about 2 and about 6.

8. A method according to claim 6 wherein step (c) further includes intermingling the refractory oxide particles and the colloidal silica in an aqueous solution at a said pH and applying the intermingled material onto the support member.

9. A method of making a catalyst with a support member carrying a catalytically active washcoat layer for treatment of exhaust emissions from diesel engines, comprising:
    a) selecting refractory oxide particles and colloidal silica, the refractory oxide being at least one selected from the group consisting of silica, alumina, titania and zirconia; and
    b) impregnating the selected refractory oxide particles with catalytically active metal by depositing the metal particles thereon; and then
    c) calcining the impregnated refractory oxide particles; and then
    d) forming a mixture of the colloidal silica and the calcined refractory oxide particles in an aqueous solution at a pH value to produce essentially an absence of repulsive charge between the colloidal silica and the particles; and then
    e) applying the mixture as a layer onto the support member; and then
    f) heating for a time and at a temperature sufficient to sinter at least a portion of the colloidal silica without deactivating the catalytically active metal.

10. A method according to claim 9 wherein the said pH is between about 2 and about 6.

11. A method according to claim 9 wherein the selected refractory oxide particles are silica particles and further comprising before step (b) calcining the silica particles for a time and at a temperature sufficient to reduce the surface area to below about 100 square meters per gram.

12. A method according to claim 9 wherein step (f) includes calcining by heating for between about one and about two hours at a temperature in a range of about 450° C. to about 650° C.

13. A method according to claim 9 including, between steps (d) and (e), maintaining the mixture at about room temperature for at least about two hours.

14. A method according to claim 9 wherein the catalytically active metal is at least one selected from the group consisting essentially of platinum, palladium, rhodium, ruthenium, copper and chromium.

* * * * *